UNITED STATES PATENT OFFICE.

IDA W. RILEY, OF EASTON, MARYLAND.

COMPOSITION OF MATTER.

1,187,097.  Specification of Letters Patent.  Patented June 13, 1916.

No Drawing.   Application filed February 16, 1915.  Serial No. 8,499.

*To all whom it may concern:*

Be it known that I, (Mrs.) IDA W. RILEY, a citizen of the United States, residing at Easton, in the county of Talbot and State of Maryland, have invented a new and useful Composition of Matter Used as a Cereal or Breakfast Food, of which the following is a specification.

*Composition.*—My composition consists of the following ingredients, combined in the proportions stated, viz:

| | |
|---|---|
| Whole wheat Pimlico flour | Six pounds |
| Cottolene | Three ounces |
| Salt | Two ounces |
| Baking powder | Two ounces |
| Ice water | Enough to make stiff dough |

These ingredients except the ice water are to be thoroughly mixed by hand. Then add the ice water, enough to make a stiff dough; make into a roll with the hands and cut into slices one inch thick, with a sharp knife. Place in baking pan, close together but not close enough to touch each other, and bake in hot oven for one hour without browning; when done let stand for twenty four hours; then break up into irregular pieces and dry thoroughly in a moderate oven, browning very slightly.

I am aware that such a composition of wheat flour, cottolene, salt, baking powder and water may be used by one skilled in the art of cookery, but I am not aware that all the ingredients of my composition have been used together.

I claim:

The herein described process of preparing a breakfast food comprising the steps of mixing about six pounds whole wheat flour, about three ounces cottolene, about two ounces baking powder, and about two ounces salt, then adding enough ice-water to make a stiff dough, rolling the dough, cutting it into slices and baking in an oven for about one hour without browning, then letting stand for about twenty four hours, and thereafter breaking the product into pieces and drying it in a moderate oven, browning very slightly.

(MRS.) IDA W. RILEY.

Witnesses:
  ARTHUR F. GRACE,
  NEHEMIAH E. CLARK.